(12) United States Patent
Warner et al.

(10) Patent No.: US 7,614,215 B2
(45) Date of Patent: Nov. 10, 2009

(54) EXHAUST TREATMENT PACKAGING APPARATUS, SYSTEM, AND METHOD

(75) Inventors: Jay Warner, Stoughton, WI (US);
Kenneth Pawson, Northamptonshire (GB); Jean-Marc Vasnier, Coventry (GB)

(73) Assignee: Cummins Filtration IP, Inc., Minneapolis, MN (US)

( * ) Notice: Subject to any disclaimer, the term of this patent is extended or adjusted under 35 U.S.C. 154(b) by 151 days.

(21) Appl. No.: 11/532,613

(22) Filed: Sep. 18, 2006

(65) Prior Publication Data
US 2008/0066451 A1 Mar. 20, 2008

(51) Int. Cl.
*F01N 3/035* (2006.01)
*F01N 3/36* (2006.01)
(52) U.S. Cl. .............................. 60/286; 60/295; 60/297
(58) Field of Classification Search .................... 60/278, 60/292, 296, 309, 317, 324, 288, 286, 295, 60/297; 422/169, 170, 172, 177
See application file for complete search history.

(56) References Cited

U.S. PATENT DOCUMENTS

| | | | | | |
|---|---|---|---|---|---|
| 2,898,202 | A | * | 8/1959 | Eriksson et al. | 422/115 |
| 3,972,685 | A | * | 8/1976 | Hanaoka | 422/175 |
| 4,356,806 | A | * | 11/1982 | Freesh | 123/568.12 |
| 4,535,588 | A | * | 8/1985 | Sato et al. | 60/286 |
| 4,916,897 | A | * | 4/1990 | Hayashi et al. | 60/286 |
| 5,345,762 | A | * | 9/1994 | Lutze | 60/288 |
| 5,601,792 | A | * | 2/1997 | Hug et al. | 422/169 |
| 5,791,146 | A | * | 8/1998 | Dungner | 60/605.2 |
| 5,887,424 | A | * | 3/1999 | Kuroshita | 60/293 |
| 6,212,885 | B1 | * | 4/2001 | Hirota et al. | 60/288 |
| 6,312,650 | B1 | * | 11/2001 | Frederiksen et al. | 422/180 |
| 6,397,586 | B1 | * | 6/2002 | Sakurai et al. | 60/288 |
| 6,422,005 | B2 | * | 7/2002 | Dolling et al. | 60/286 |
| 6,444,177 | B1 | * | 9/2002 | Muller et al. | 422/177 |
| 6,588,203 | B2 | * | 7/2003 | Hirota et al. | 60/297 |
| 6,622,482 | B2 | * | 9/2003 | Knight et al. | 60/299 |
| 6,625,978 | B1 | * | 9/2003 | Eriksson et al. | 60/311 |
| 6,823,663 | B2 | * | 11/2004 | Hammerle et al. | 60/286 |
| 6,824,743 | B1 | * | 11/2004 | Pawson et al. | 422/171 |
| 6,837,336 | B2 | * | 1/2005 | Gault et al. | 181/258 |
| 7,010,910 | B2 | * | 3/2006 | Watanabe et al. | 60/300 |
| 7,159,393 | B2 | * | 1/2007 | Blomquist et al. | 60/302 |
| 7,210,287 | B2 | * | 5/2007 | Bolander et al. | 60/296 |
| 2002/0157387 | A1 | * | 10/2002 | Hirota et al. | 60/296 |

(Continued)

FOREIGN PATENT DOCUMENTS

GB 2381218 A * 4/2003

*Primary Examiner*—Thomas E Denion
*Assistant Examiner*—Jonathan Matthias
(74) *Attorney, Agent, or Firm*—Kunzler & McKenzie (57) ABSTRACT

An exhaust treatment packaging apparatus, system, and method includes an elongate exhaust gas passage comprising an inlet for the entrance of flowing exhaust gases and an outlet for the exit of the gases. A catalytic device comprising an inlet and an outlet completely or partially overlaps the passage to reduce the length required for the system. The passage outlet is disposed adjacent the catalytic device inlet, and a flow connector connects the passage outlet to the catalytic device inlet. A particulate filter or other treatment device may be substituted for or added to the catalytic device. A doser disposed upstream of the passage doses an additive which evaporates, mixes, or otherwise undergoes change in the passage before reaching the catalytic device.

25 Claims, 4 Drawing Sheets

U.S. PATENT DOCUMENTS

2003/0110763 A1* 6/2003 Pawson et al. ............... 60/286
2004/0083724 A1* 5/2004 Nakatani ..................... 60/286
2006/0153748 A1* 7/2006 Huthwohl et al. ........... 422/172

* cited by examiner

EXHAUST TREATMENT PACKAGING APPARATUS, SYSTEM, AND METHOD

BACKGROUND OF THE INVENTION

1. Field of the Invention

This invention relates to exhaust treatment systems, and more particularly to efficient packaging and use of those systems.

2. Description of the Related Art

Stricter environmental regulations in the United States and Europe are requiring the use of exhaust treatment devices such as particulate filters and/or catalytic devices on diesel engines to reduce harmful emissions including nitrogen oxides (NOx), hydrocarbons, carbon monoxide, soot, ash, and other substances. Space is usually at a premium on diesel engines and their related components, particularly on trucks or other moving vehicles, and it is desirable that the additional exhaust treatment components be compacted into as small a space as possible.

The problem of efficient use of exhaust stream additive chemicals makes the issue of space more difficult, since many additives, after being injected or "dosed" into the exhaust stream, need to mix, undergo chemical change, be evaporated, or otherwise be modified from their original injected form before encountering exhaust treatment components such as flow-through catalytic devices or particulate filters.

For example, a particulate filter needs to be regenerated on occasion, regeneration meaning the removal of soot and other substances that have accumulated on the filter, by heating the filter to a high temperature and removing the soot through oxidation. In many cases, to reach the high temperatures needed for regeneration, a hydrocarbon (typically diesel fuel in the case of diesel engines) is dosed into the exhaust stream and allowed to mix with the exhaust gases and evaporate from its dosed liquid form. The hydrocarbon is then oxidized on an oxidation catalyst, releasing heat which raises the exhaust gas temperature to the level required for filter regeneration. Similar dosing of urea or ammonia is also often used as a reductant for of selective catalytic reduction (SCR) devices, which remove NOx from the exhaust.

For proper mixing and evaporation of the hydrocarbon it is necessary to provide a length of straight, open exhaust tube, more than 0.3 meters in many cases, before reaching the oxidation catalyst. If there are bends in the tube the hydrocarbon hits the side wall of the tube before evaporating and collects there. Too short a distance can result in unevaporated hydrocarbon mixing with soot in the exhaust system and gumming up the oxidation catalyst.

SCR devices are generally used in conjunction with upstream doses of urea. Typically, the urea is dosed into the exhaust stream, its water evaporates leaving urea crystals, and the increasing temperature of the crystals causes them to convert to ammonia, which mixes with the exhaust and is then used on the SCR to convert NOx to nitrogen and water. The length of tubing needed for the urea drying and decomposition process, as well as the ammonia mixing, may range from 0.3 meters to a meter, the tubing needing to be straight and free from section changes to avoid unevaporated urea from collecting on the side walls, a factor that also impacts other additives including hydrocarbon. In addition to reducing the amount of ammonia reaching the SCR device, the unevaporated urea can produce acids that corrode the tube material.

Other exhaust treatment devices that call for dosing include lean NOx catalysts and others. The space requirement of these additive treatments is difficult to incorporate into the limited space allocated to exhaust treatment.

SUMMARY OF THE INVENTION

The present invention has been developed in response to the present state of the art, and in particular, in response to the problems and needs in the art that have not yet been fully solved by currently available exhaust treatment packaging systems. Accordingly, the present invention has been developed to provide an exhaust packaging apparatus, system, and method that overcome some or all shortcomings in the art.

In one aspect of the invention, an exhaust treatment packaging apparatus includes a first passage configured to house exhaust gases in a first direction. A reverse-flow mechanism is configured to receive the exhaust gases from the first passage and cause the exhaust gases to flow in a second direction substantially opposite to the first direction. A second passage disposed next to the first passage is configured to receive the exhaust gases from the reverse-flow mechanism and house the exhaust gases flowing in the second direction. An exhaust treatment device is disposed within the second passage.

In one embodiment, the exhaust treatment device is an oxidation device or a particulate filter, and a doser is included upstream of the exhaust treatment device. In a further embodiment, the second passage is annular in cross-section and elongate such that its outer surface is cylindrical. In this embodiment, the first passage is substantially cylindrical and disposed through the hole of the second passage.

In a further embodiment, the second passage is defined by an elongate second-passage housing that is racetrack-shaped in cross section, with two curved ends and two substantially straight sides in cross-section. An elongate first-passage housing is disposed on one of the straight sides of the second-passage housing, and the first passage is disposed between the first-passage housing and the second-passage housing.

In a further aspect of the invention, a method of treating exhaust gases includes moving the gases such that they constitute an exhaust gas stream, dosing an additive into the exhaust gas stream, and urging the exhaust gas stream through a first passage in a first direction. The exhaust gas stream direction is then reversed and urged through a treatment passage in a second direction substantially opposite to the first direction.

In a further aspect of the invention, a diesel exhaust gas stream treatment system includes a housing with first and second elongate exhaust gas channels disposed in parallel arrangement within the housing. Each channel includes an inlet end and an outlet end, the outlet end of the first channel being connected to the inlet end of the second channel such that the gas stream travels down the first channel in a first direction and down the second channel in a second direction, with the second direction being substantially the opposite of the first. A catalytic device is disposed in the second channel.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments illustrated in the appended drawings, which depict only typical embodiments of the invention and are not to be considered limiting of its scope, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
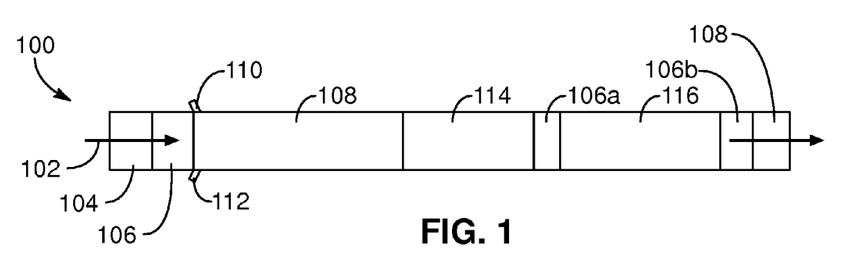
FIG. 1 is an elevational view of an exhaust treatment packaging system with space provided in series with the components.

FIG. 1 shows an example of a diesel exhaust treatment system 100 that provides space between components, allowing for evaporation, mixing, and chemical change of dosed additives, but which causes the system 100 to be undesirably long. The system 100 comprises a number of components arranged in series: an input module 104; a diesel oxidation catalyst 106; a urea doser 110 and hydrocarbon doser 112; a space 108; an SCR device 114; a second diesel oxidation catalyst 106a; a particulate filter 116; a third diesel oxidation catalyst 106b; and an outlet module 118. The exhaust gases flow through the components in the direction of the arrows 102.

In operation, the gases are produced by a diesel engine (not shown) and enter the system through the system intake module 104. They then flow through the diesel oxidation catalyst 106, and enter the space 108 with the urea doser 110 and the hydrocarbon doser 112 disposed on the upstream end of the space 108. The dosers 110 and 112 dose urea and hydrocarbon, respectively, into the system 100, and may be constructed as injectors, nozzles, etc., as is known. The dosers 110 and 112 may be controlled by a controller or other device to determine dosing timing and amount. Generally, the urea doser 110 will dose the urea on a regular basis for proper functioning of the SCR device 114, and the hydrocarbon doser 112 will dose the hydrocarbon as needed when regeneration of the particulate filter 116 is called for.

The SCR device 114 is located after the space 108, giving time for the urea to evaporate and the resulting crystals to convert to ammonia, which the SCR device 114 uses for its function of converting and removing NOx from the gases. The hydrocarbon mixes with the exhaust gases and evaporates in the space 108.

With certain limitations, the location of components within the system 100 can be changed as needed.

The exhaust gases flow through the second diesel oxidation catalyst 106a after exiting the SCR device 114; in the catalyst 106a the evaporated hydrocarbon is oxidized and heat is generated. The heated gases enter the particulate filter 116, which is wholly or partially regenerated from the heat. The gases pass through the third oxidation catalyst 106b to remove unevaporated hydrocarbons and other substances, enter the outlet module 118, and exit to atmosphere.

Figure 2:
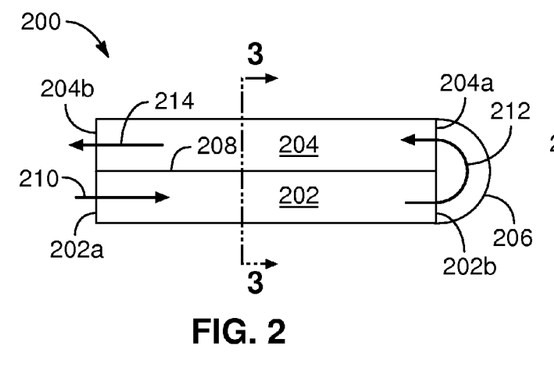
FIG. 2 is a cross-sectional view of one embodiment of an exhaust treatment packaging apparatus according to the present invention.
Figure 3:
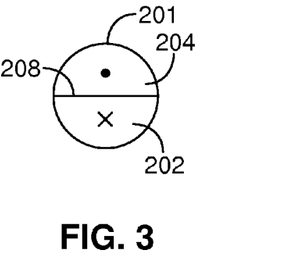
FIG. 3 is a cross-sectional view along line 3-3 of FIG. 2.

FIGS. 2 and 3 show a simple embodiment of one aspect of the present invention, which comprises making the necessary space in the system co-extensive, meaning completely or partially overlapping, with one or more components of the system. As shown, a simple exhaust treatment system 200 comprises a cylindrical housing 201, a first passage or channel 202 extending through the housing 201, the first passage having an inlet 202a and an outlet 202b, and a second passage 204 extending through the housing 201. The passages are defined by a wall 208 bisecting the housing 201. The second passage 204 is co-extensive with, adjacent to, and parallel to the passage 202, and has an inlet 204a and an outlet 204b. A rounded cap 206 is disposed on the end of the housing 201, covering the outlet 202b and inlet 204a.

In operation, an exhaust gas stream enters the inlet 202a, as shown by the arrow 210, and travels through the first passage 202. In FIG. 3, the X drawn in the first passage 202 indicates that the direction of travel of the gases in the Z direction is into the page, away from the viewer. Upon going through the outlet 202b, the rounded shape of the cap 206 changes the gas flow direction as indicated by arrow 212, reversing the direction and causing the gases to enter the inlet 204a.

Other flow connectors, devices, or mechanisms suitable for reversing or changing the flow are also possible, and will be apparent to those skilled in the art in light of this disclosure while remaining within the scope of the invention.

After having its direction reversed by the cap 206, the exhaust gases flow through the second passage 204 in the direction shown by arrow 214. In FIG. 3, the dot drawn in the second passage 204 indicates that the direction of travel of the gases in the Z direction is out of the page, toward the viewer. The gases exit the system 200 through the outlet 204a.

It can be seen that making the passages 202 and 204 co-extensive shorten the length of the system 200 compared with an end-to-end arrangement.

Figure 4:
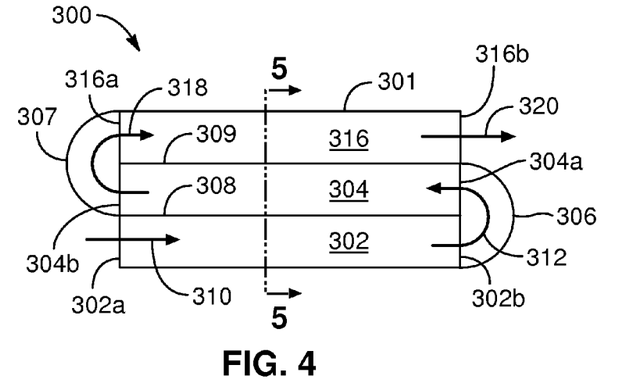
FIG. 4 is a cross-sectional view of another embodiment of an exhaust treatment packaging apparatus according to the present invention.
Figure 5:
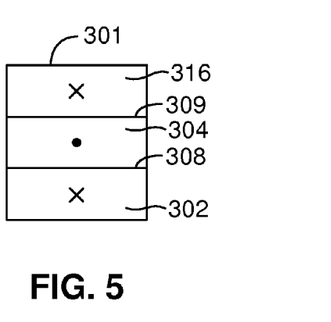
FIG. 5 is a cross-sectional view along line 5-5 of FIG. 6.

FIGS. 4 and 5 show another embodiment of the present invention, which allows for exit of the gases from the system at the opposite end of the entrance. The figures show a system 300 comprising an elongate housing 301, square in cross-section, a first passage 302 disposed within the housing, the passage 302 having an inlet 302a and an outlet 302b, a second passage 304 disposed within the housing, the passage 304 having an inlet 304a and an outlet 304b, and a third passage 316 disposed within the housing, the passage 316 having an inlet 316a and an outlet 316b. The passages are co-extensive and parallel, with the first passage 302 being adjacent to the second passage 304 and the second passage 304 being adjacent to the third passage 316. The passages are defined by the housing 301 and walls 308 and 309. A rounded end cap 306 is disposed on one end of the housing 301, covering the outlet 302b and the inlet 304a, and a second rounded end cap 307 is disposed on the other end of the housing 301, covering the outlet 304b and the inlet 316a.

In operation, the system 300 works in part similarly to the system 200 in that an exhaust gas stream enters the inlet 302a, as shown by the arrow 310, and travels through the first passage 302. In FIG. 5, the X drawn in the first passage 302 indicates that the direction of travel of the gases in the Z direction is into the page, away from the viewer. Upon going through the outlet 302b, the rounded shape of the cap 306 changes the gas flow direction, as indicated by the arrow 312, reversing the direction and causing the gases to enter the inlet 304a. After having its direction reversed by the cap 306, the exhaust gases flow through the second passage 304 in the direction shown by the arrow 312. In FIG. 5, the dot drawn in the second passage 304 indicates that the direction of travel of the gases in the Z direction is out of the page, toward the viewer.

Instead of exiting the system 300 through the outlet 304b, the cap 307 causes the gas flow direction to reverse again, as indicated by the arrow 318, causing the gas to flow through the third passage 316 in the direction indicated by the arrow 320. In FIG. 5, the X drawn in the third passage 316 indicates that the direction of travel of the gases in the Z direction is again into the page, away from the viewer, parallel to the direction of the gases in the first passage 302. The gases exit the system 300 through the outlet 316b.

It will be appreciated that the directions of gas flow through the different passages need not be exactly parallel to fall within the scope of the present invention, as long as the passages are at least partially overlapping. It will also be appreciated that the walls separating the passages may be thick or thin and may include other spaces or structures, making the passages substantially if not immediately adjacent. Generally, the closer the passages are to each other the smaller the overall space of the system will be, which is desirable in most applications. The system will also be smaller if the passages are completely co-extensive, but they only need be partially co-extensive to realize the advantages of the invention.

Figure 6:
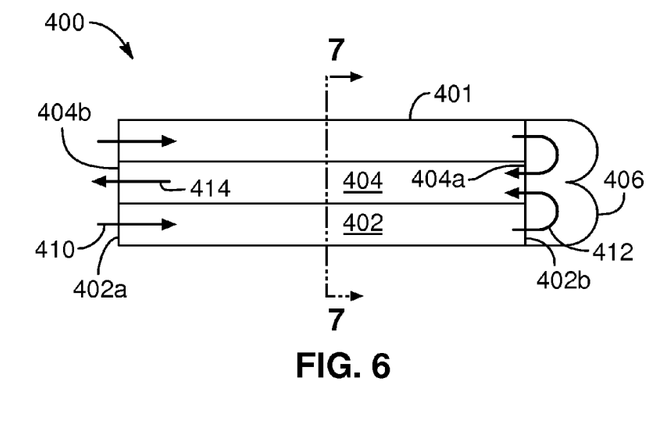
FIG. 6 is a cross-sectional view of another embodiment of an exhaust treatment packaging apparatus according to the present invention.
Figure 7:
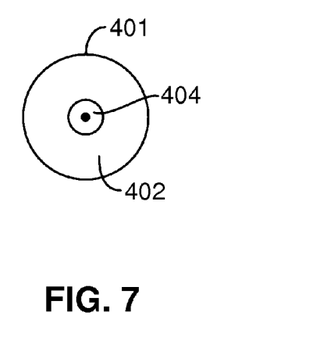
FIG. 7 is a cross-sectional view along line 7-7 of FIG. 6.

FIGS. 6 and 7 show another embodiment of the present invention in which the passages are co-extensive in a different way. The embodiment shown comprises a system 400 having an elongate cylindrical housing 401 and a first passage 402, annular in cross-section, disposed through the housing 401 and having an inlet 402a and an outlet 402b. A second passage 404 is disposed through the central hole of the first passage 402, the passage 404 having an inlet 404a and an outlet 404b. An end cap 406 is disposed on one end of the housing 401, covering the outlet 402b and the inlet 404a. The end cap 406 differs from the reverse-flow mechanisms discussed above in that it is designed to reverse the gas flow from the annular outlet 402b and direct it toward the central inlet 404a. The end cap 406 thus is rounded in an annular fashion, much like a BUNDT® cake pan.

In operation, an exhaust gas stream enters the annular inlet 402a, as shown by the arrows 410, and travels through the first passage 402. In FIG. 7, the X drawn in the first passage 402 indicates that the direction of travel of the gases in the Z direction is into the page, away from the viewer. Upon going through the annular outlet 402b, the shape of the cap 406 changes the gas flow direction, as indicated by arrows 412, reversing the direction and causing the gases to enter the inlet 404a.

After having its direction reversed by the cap 406, the exhaust gases flow through the second passage 404 in the direction shown by the arrow 414. In FIG. 7, the dot drawn in the second passage 404 indicates that the direction of travel of the gases in the Z direction is out of the page, toward the viewer. The gases exit the system 400 through the outlet 404a.

Figure 8:
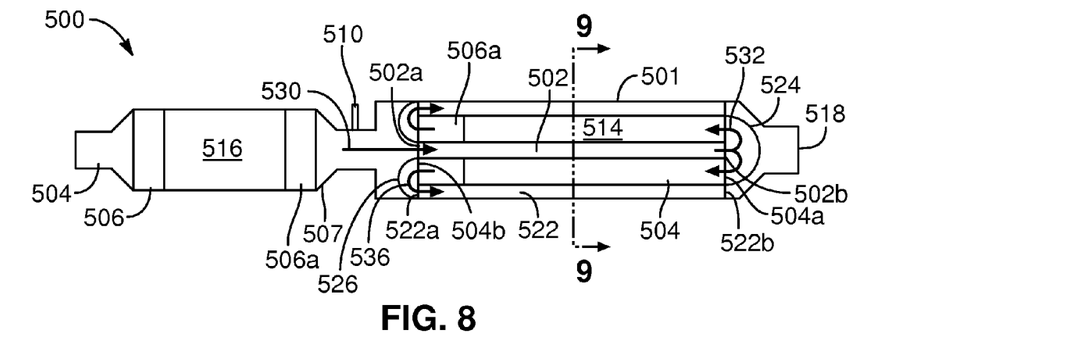
FIG. 8 is a cross-sectional view of an embodiment of an exhaust treatment packaging system according to the present invention.
Figure 9:
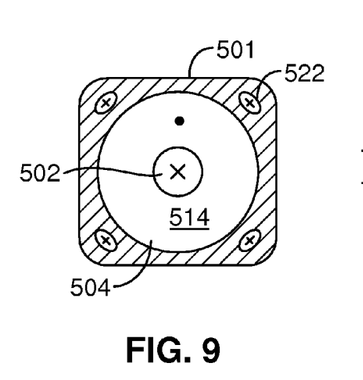
FIG. 9 is a cross-sectional view along line 9-9 of FIG. 8.

FIGS. 8 and 9 show an embodiment of the present invention with more specificity regarding diesel exhaust treatment systems. The figures show an exhaust treatment system 500 which includes an inlet 504, a diesel oxidation filter 506, a diesel particulate filter 516, a diesel oxidation filter 506a, a component connector section 507, a urea doser 510, and a housing 501. The component connector section 507 tapers in diameter from the diesel oxidation filter 506a and the housing 501. Baffles and/or other components designed for homogenization or other manipulation of exhaust gas may be added into the system 500, as will be apparent to those skilled in the art in light of this disclosure.

The housing 501 is substantially square in cross-section, with rounded corners, as can be seen most clearly in FIG. 9. A first cylindrical central passage or channel 502 is disposed within the housing 501, with an inlet 502a and an outlet 502b. A second passage 504, annular in cross-section, is disposed within the housing around the first passage 502, the passage 504 having an inlet 504a and an outlet 504b. Four third passages 522 are disposed within the housing radially outward of the second passage 504, the third passages each being disposed in a corner of the housing 501 between the outer surface of the housing 501 and the second passage 504. Each third passage 522 has an inlet 522a and an outlet 522b.

The passages or channels are co-extensive and parallel, with the first passage 502 being adjacent to the second passage 504, and the second passage 504 being adjacent to the third passages 522. A rounded end cap 524 covers the outlet 502b and the inlet 504a, and an annular rounded end cap 526 covers the outlet 504b and the inlets 522a. An outlet module 518 is disposed at the end of the housing 501 in communication with the third passage outlets 522b.

The annular second passage 504 contains a flow-through SCR device 514 and a diesel oxidation filter 506b. Both catalytic devices 514 and 506b are annular in cross-section, sometimes referred to as "doughnut" catalysts due to their shape, and are currently manufactured and available.

In operation, exhaust produced by a diesel engine (not shown) enters the inlet module 504, passes through the diesel oxidation filter 506, through the particulate filter 516, and through the diesel oxidation filter 506a. The exhaust, now having had some of its components oxidized and having been filtered for particulates, flows through the component connector section 507 and is dosed with urea from the urea doser 510. Given that the end cap 526 covers the passages 504 and 522, the exhaust enters the inlet 502a and flows through the first passage 502 in the direction of the arrow 530. In FIG. 9, the X drawn in the first passage 502 indicates that the direction of travel of the gases in the Z direction is into the page, away from the viewer.

The first passage 502 is open and of sufficient length to allow the urea to mix with the exhaust, evaporate, and be converted to ammonia.

Upon reaching the outlet 502b and end cap 524, the exhaust flow direction is reversed, as shown by the arrows 532, and the exhaust enters the inlet 504a and flows through the second passage 504—including the SCR device 514 and diesel oxidation filter 506b, which are disposed within the passage 504—in the direction indicated by the arrows 532. In FIG. 9, the dot drawn in the second passage 504 indicates that the direction of travel of the gases in the Z direction is out of the page, toward the viewer. The ammonia created in the first passage 502 is in condition for use by the SCR device 514 upon reaching the inlet 504a.

Upon the gases reaching the outlet 504b and end cap 526, their direction is again reversed, as shown by the arrows 536, causing them to flow through the third passages 522 in the direction indicated by the arrows 538. In FIG. 9, the X drawn in the third passages 522 indicates that the direction of travel of the gases in the Z direction is again into the page, away from the viewer, parallel to the direction of the gases in the first passage 502. The gases then exit the system 500 through the outlets 522b and outlet module 518.

Figure 10:
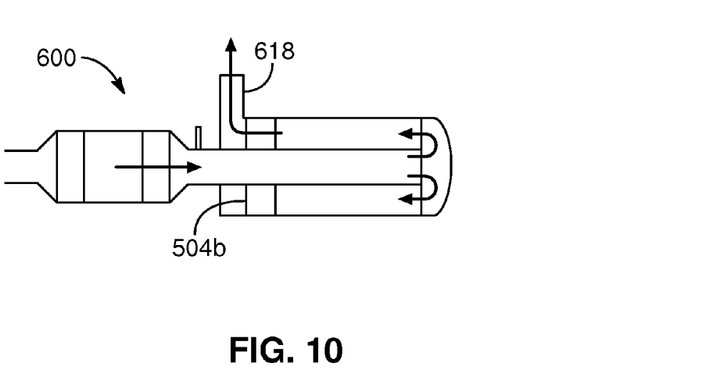
FIG. 10 is a cross-sectional view of another embodiment of an exhaust treatment packaging system according to the present invention.

FIG. 10 shows a modification of the apparatus shown in FIGS. 8 and 9, with the exhaust leaving the system in a different location. It is often desirable to have the exhaust leave the system on the opposite side of which it entered, such as in FIG. 4, however, having the exhaust leave at a different location, such as in FIG. 2, simplifies the apparatus.

FIG. 10 shows a system 600 which is similar in construction and operation to the system 500, except that it does not contain a third passage which directs the exhaust to the opposite end of the system from which it entered. Instead, when the exhaust reaches the outlet 504b, a system outlet 618 is provided in the housing at that location, the outlet 618 being constructed on a side of the housing and configured to collect the exhaust from the annular outlet 504b for immediate expulsion of the exhaust to atmosphere.

Figure 11:
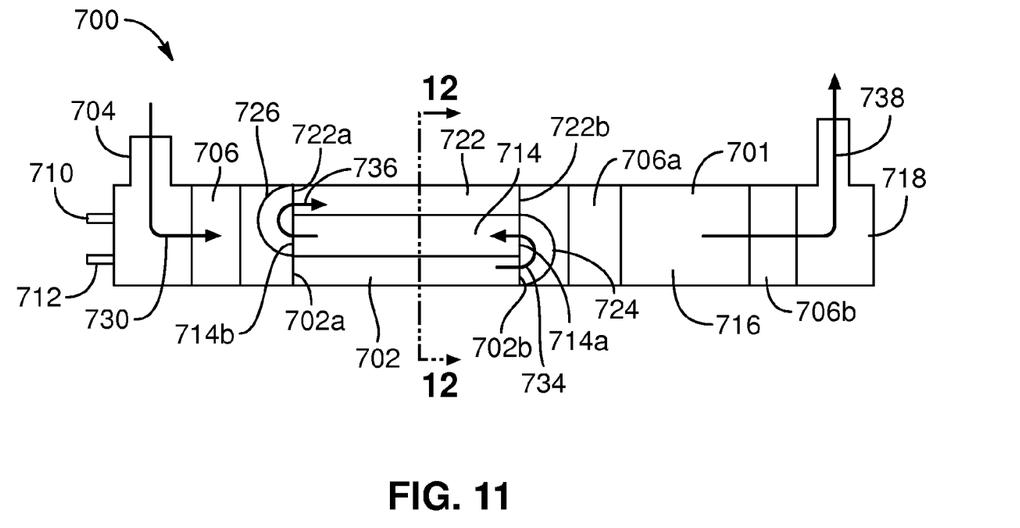
FIG. 11 is a cross-sectional view of another embodiment of an exhaust treatment packaging system according to the present invention.
Figure 12:
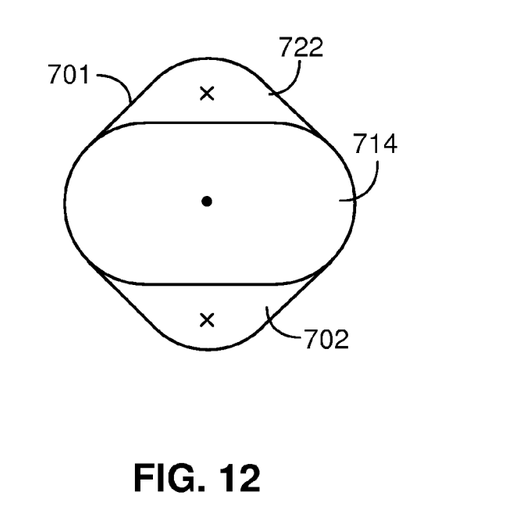
FIG. 12 is a cross-sectional view along line 12-12 of FIG. 11.

FIGS. 11 and 12 show another embodiment of an exhaust treatment system 700 according to the invention. The system 700 comprises a housing 701 containing an inlet module 704, with a urea doser 710 and a hydrocarbon doser 712 disposed on the inlet module 704. The housing further contains a diesel oxidation filter 706 and an SCR device 714 having an inlet 714a and an outlet 714b. As can be seen most clearly in FIG. 12, the SCR device 714 is shaped in cross-section as an oval with straight sides often referred to as a "racetrack" shape. A first passage 702 is disposed on one side of the SCR device 714, on a straight portion of the racetrack, the passage 702 being defined by the housing 701 and the straight side of the SCR device 714. The housing 701 and passage 702 can be constructed by a metal pressing or welding of the housing 701 against the SCR device 714. The first passage 702 has an inlet 702a and an outlet 702b. A rounded end cap 724 covers the outlet 702b and inlet 714a. The flow-through SCR device 714 itself, or the SCR device 714 together with a housing, comprises a second passage. A third passage 722 is disposed on a side of the SCR device 714 opposite the first passage 702, the first and third passages 702 and 722 being similar in design and construction. The third passage 722 has an inlet 722a and an outlet 722b. A rounded end cap 726 covers the outlet 714b and inlet 722a.

The system 700 further comprises a second diesel oxidation filter 706a, a diesel particulate filter 716, a third diesel oxidation filter 706b, and an outlet module 718.

In operation, exhaust produced by a diesel engine (not shown) enters the inlet module 704 in the direction shown by the arrow 730. The exhaust is dosed with urea and hydrocarbon with the dosers 110 and 112, respectively. The exhaust passes through the diesel oxidation catalyst 706 and enters the inlet 702a, passing through the first passage 702 in the direction indicated by the arrow 706. In FIG. 12, the X drawn in the first passage 702 indicates that the direction of travel of the gases in the Z direction is into the page, away from the viewer. The first passage 702 is open and of sufficient length to allow the urea and hydrocarbon to mix, evaporate, and otherwise undergo the changes necessary for efficient use by downstream exhaust treatment components.

The exhaust, together with the additives, now modified, reverses direction upon reaching the outlet 702b and end cap 724, entering the inlet 714a and passing through the SCR device 714 in the direction indicated by the arrow 734, with the ammonia resulting from the urea dosed by the doser 110 being in condition for efficient use. In FIG. 12, the dot drawn in the SCR device 714 indicates that the direction of travel of the gases in the Z direction is out of the paper, toward the viewer. Upon reaching the outlet 714b of the SCR device 714, and end cap 726, the exhaust again reverses direction, enters the inlet 722a, and passes through the third passage 722 in the direction indicated by the arrow 736. In FIG. 12, the X drawn in the third passage 722 indicates that the direction of travel of the gases in the Z direction is into the paper, away from the viewer.

The gases then exit the third passage outlet 722b and pass through the diesel oxidation filter 706a, which oxidizes the evaporated hydrocarbon, generating heat. The heated exhaust gases then enter the particulate filter 716, regenerating it, then pass through the diesel oxidation filter 706b, into the outlet module 718, and exit the system in the direction indicated by the arrow 738.

The system 700 may be modified, if desired, to eliminate the third passage 722, having the exhaust gases pass directly from the SCR device 714 to the diesel oxidation filter 706a and particulate filter 716. This could be accomplished by providing an outlet on the side of the housing, much like the apparatus shown in FIG. 10, with the oxidation and particulate filters attached.

As will be apparent to those skilled in the art in light of this disclosure, the apparatus 700 may be modified in various ways while remaining within the scope of the invention. The locations of the components may be modified, such as switching the locations of the SCR device 714 and particulate filter 716. As indicated with regard to other figures herein, different passage and/or component shapes may be used other than the racetrack shape, such as oval, L-shaped, circular, toroidal, or other profiles.

The schematic flow chart diagram that follows is generally set forth as a logical flow chart diagram. As such, the depicted order and labeled steps of the diagram, as well as the preceding discussion regarding operation of the disclosed apparatus and system embodiments, are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 13:
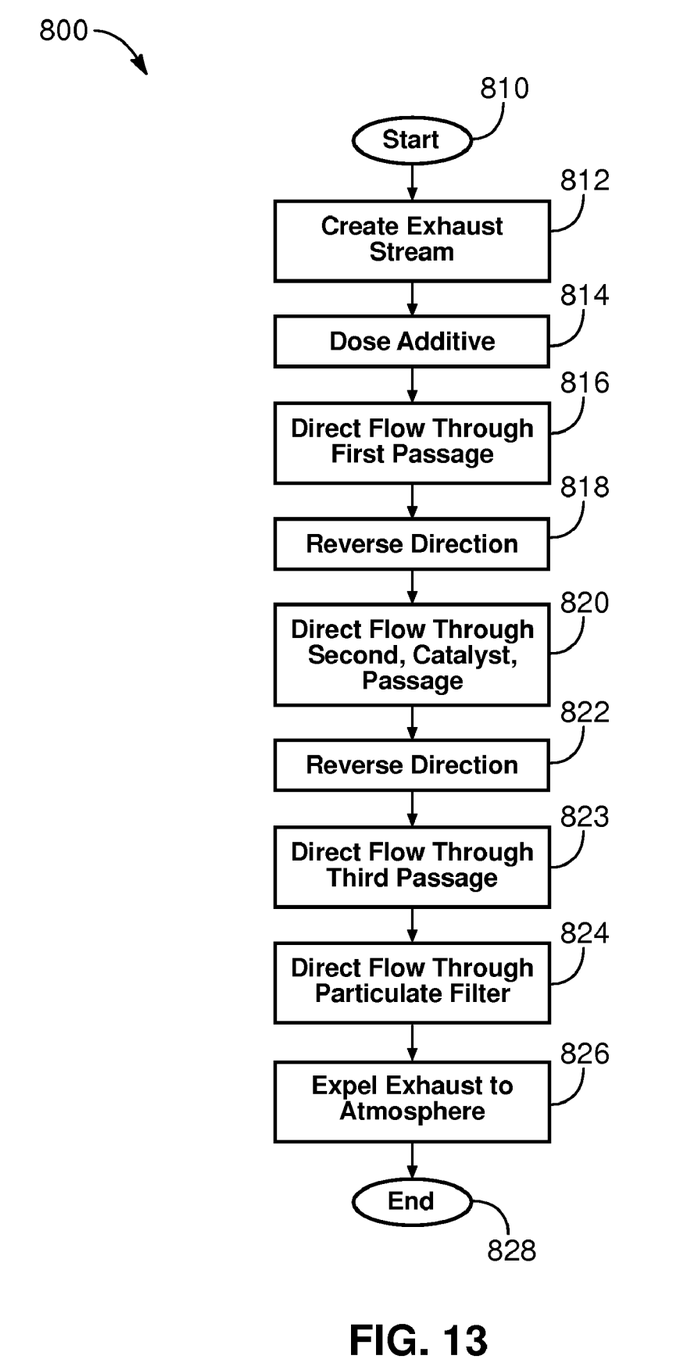
FIG. 13 is a schematic flow chart diagram illustrating an embodiment of a method of treating and directing exhaust gas flow according to the present invention.

FIG. 13 shows an embodiment of a method 800 of treating and directing an exhaust gas flow. The method begins in block 810, and an exhaust stream is created in block 812, such as through the action of an internal combustion engine creating and propelling the exhaust through an exhaust treatment system. An additive such as hydrocarbon and/or urea is dosed in block 814, and the exhaust flow is urged or directed through a first open passage, block 816, wherein the additive can be mixed and/or otherwise changed. The direction of the exhaust flow is then reversed in block 818, and the exhaust flow is directed through a second passage containing a catalytic device, block 820. After passing through the catalytic device, the exhaust flow again reverses direction, block 822, and flow is directed through a third passage, block 823. The exhaust flow is then directed through a particulate filter, block 824, the flow is expelled to atmosphere, block 826, and the method ends in block 828.

Only a portion of the method 800 may be carried out while remaining within the scope of the invention, such as eliminating the second reversal of direction and the passage through the third passage and particulate filter. Conversely, steps may be added, such as urging the exhaust flow through baffles and/or oxidation filters. The order of steps may also be changed while remaining within the scope of the invention, such as locating the particulate filter in the second passage and directing flow through the particulate filter at that time (block 820), while locating the catalytic device after the third passage and directing flow through the catalytic device at that time (block 824), essentially reversing the order in which the flow is directed through the two devices. Other changes and modifications to the method 800 will be apparent to those skilled in the art in light of this disclosure while remaining within the scope of the invention.

The present invention may be embodied in other specific forms without departing from its spirit or essential characteristics; for example, different treatment components may be substituted for those shown in the drawings. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An exhaust treatment packaging apparatus, the apparatus comprising:
    a housing having an exhaust inlet and exhaust outlet;
    a first passage configured to house exhaust gases flowing in a first direction, the first passage being disposed within the housing;
    a first additive doser coupled to the housing between the exhaust inlet and first passage, the first additive doser being configured to dose a first additive into the exhaust prior to being housed in the first passage;
    a second additive doser coupled to the housing between the exhaust inlet and first passage, the second additive doser being configured to dose a second additive into the exhaust prior to being housed in the first passage, the first additive being different than the second additive;
    a reverse-flow mechanism configured to receive the exhaust gases from the first passage and cause the exhaust gases to flow in a second direction substantially opposite the first direction, the reverse-flow mechanism being disposed within the housing;
    a second passage disposed adjacent the first passage, the second passage configured to receive the exhaust gases from the reverse-flow mechanism and house the exhaust gases flowing in the second direction, the second passage being disposed within the housing;
    a first exhaust treatment device disposed within the second passage, the first exhaust treatment device configured to utilize the first additive to treat the exhaust gases, wherein the first exhaust treatment device comprises an inlet in exhaust gas receiving communication with exhaust gases flowing in the second direction and an outlet in exhaust gas providing communication with the second passage to provide exhaust gases flowing in the second direction;
    a second exhaust treatment device disposed within the housing, the second exhaust treatment device configured to utilize the second additive to treat the exhaust gases; and
    an inlet module disposed within the housing and positioned between the exhaust inlet and the first passage, the inlet module being configured to receive exhaust from the exhaust inlet and provide exhaust to the first passage, wherein the first additive doser is configured to dose the first additive into the inlet module and the second additive doser is configured to dose the second additive into the inlet module, and wherein the inlet module comprises a cross-sectional area equal to or greater than a combined cross-sectional area of the first and second passages.

2. The apparatus of claim 1, wherein the reverse-flow mechanism comprises a first reverse-flow mechanism, the apparatus further comprising a second reverse-flow mechanism configured to receive the exhaust gases from the second passage, the second reverse-flow mechanism further configured to cause the exhaust gases to flow substantially in the first direction, and further comprising a third passage disposed adjacent the second passage, the third passage configured to receive the exhaust gases from the second reverse-flow mechanism and house the exhaust gases flowing substantially in the first direction.

3. The apparatus of claim 2, wherein the second passage is defined by an elongate second-passage housing that is racetrack-shaped in cross-section, with two curved ends and two substantially straight sides in cross-section, further comprising an elongate first-passage housing disposed on one of the straight sides of the second-passage housing, wherein the first passage is disposed between the first-passage housing and the second-passage housing, and further comprising an elongate third-passage housing disposed on the other straight side of the second-passage housing, and wherein the third passage is disposed between the first-passage housing and the third-passage housing.

4. The apparatus of claim 2, wherein the inlet module comprises a cross-sectional area equal to or greater than a combined cross-sectional area of the first, second, and third passages.

5. The apparatus of claim 1, wherein at least one of the first and second exhaust treatment devices comprises a flow-through catalytic treatment device.

6. The apparatus of claim 1, further comprising a particulate filter disposed within the housing.

7. The apparatus of claim 1, wherein the second passage is annular in cross-section and elongate such that its outer surface is cylindrical, and wherein the first passage is substantially cylindrical and disposed though the hole of the second passage.

8. The apparatus of claim 1, wherein the second passage is annular in cross-section and elongate such that its outer surface is cylindrical and the first passage is substantially cylindrical and disposed through the hole of the second passage, and wherein the housing being elongate, radially larger than the second passage, and co-extensive in length with the second passage, the axis of the housing being substantially parallel to the axis of the second passage, and further comprising a third passage disposed through the housing, the third passage being substantially parallel to the second passage.

9. The apparatus of claim 8, wherein the housing is substantially square in cross-section and the second passage is disposed wholly within the housing, and wherein the third passage is disposed through a corner of the housing.

10. The apparatus of claim 1, wherein the second passage is defined by an elongate second-passage housing that is race-track-shaped in cross-section, with two curved ends and two substantially straight sides in cross-section, and further comprising an elongate first-passage housing disposed on one of the straight sides of the second-passage housing, and wherein the first passage is disposed between the first-passage housing and the second-passage housing.

11. The apparatus of claim 1, wherein the first exhaust treatment device comprises a selective catalytic reduction catalyst and the second exhaust treatment device comprises a first oxidation catalyst downstream of the selective catalytic reduction catalyst, the apparatus further comprising a second oxidation catalyst disposed within the inlet module, a particulate matter filter downstream of the selective catalytic reduction catalyst and second oxidation catalyst, and a third oxidation catalyst downstream of the particulate matter filter, wherein the particulate matter filter and third oxidation catalyst are disposed within the housing.

12. A method of treating exhaust gases, the method comprising:
moving the exhaust gases such that they constitute an exhaust gas stream into an inlet module of a housing;
dosing a first additive into the exhaust gas stream in the inlet module after entering the housing;
dosing a second additive into the exhaust gas stream in the inlet module after entering the housing;
urging the exhaust gas stream from the inlet module through a first passage positioned within the housing in a first direction after being dosed with the first and second additives;
reversing the direction of the exhaust gas stream;
urging the exhaust gas stream through a treatment passage positioned within the housing and a first exhaust treatment component positioned within the treatment passage in a second direction substantially opposite the first direction, wherein the treatment passage adjoins the first passage along an axial length of the exhaust treatment component, and wherein the inlet module comprises a cross-sectional area equal to or greater than a combined cross-sectional area of the first passage and treatment passage;
treating the exhaust gas stream in the first exhaust treatment component using the first additive;
urging the exhaust gas stream through a second exhaust treatment component positioned within the housing and downstream of the first exhaust treatment component; and
treating the exhaust gas stream in the second exhaust treatment component using the second additive.

13. The method of claim 12, further comprising reversing the direction of the exhaust gas stream a second time and urging the exhaust gases through a third passage substantially in the first direction.

14. The method of claim 12, further comprising catalytically treating the exhaust gas stream in the treatment passage.

15. The method of claim 12, wherein the first additive is urea and the first exhaust treatment component includes a selective catalytic reducer, the method further comprising convening at least a portion of the urea to ammonia in the first passage and using the ammonia to enhance treatment of the exhaust gases in the selective catalytic reducer.

16. The method of claim 15, wherein the second additive is a liquid hydrocarbon and the second exhaust treatment component is an oxidation filter, the method further comprising evaporating at least a portion of the liquid hydrocarbon in the first passage.

17. The method of claim 12, further comprising filtering the exhaust gas stream.

18. An exhaust gas treatment packaging apparatus, the apparatus comprising:
an exhaust inlet section comprising a first catalytic device;
an elongate exhaust gas passage in exhaust receiving communication with the exhaust inlet section, the elongate exhaust gas passage comprising an inlet for the entrance of flowing exhaust gases and an outlet for the exit of the gases, wherein exhaust gases flow through the elongate exhaust gas passage in a first direction;
a second catalytic device comprising an inlet and an outlet, the second catalytic device disposed co-extensive with the passage and the passage outlet disposed adjacent the second catalytic device inlet;
a flow connector connecting the passage outlet to the second catalytic device inlet, wherein the flow connector is configured to facilitate exhaust gas flow through the second catalytic device in a second direction opposite the first direction;
a first additive doser coupled to the exhaust inlet section and communicable in first additive dosing communication with exhaust gas within the exhaust inlet section;
a second additive doser coupled to the exhaust inlet section and communicable in second additive dosing communication with exhaust gas within the exhaust inlet section, the first additive being different than the second additive;
a third catalytic device downstream of the first and second catalytic devices;
a particulate matter filter downstream of the first, second, and third catalytic devices;
a fourth catalytic device downstream of the particulate matter filter;
a housing within which the exhaust inlet section, elongate exhaust gas passage, first catalytic device, second catalytic device, flow connector, third catalytic device, particulate matter filter, and fourth catalytic device are housed;

wherein the second catalytic device is configured to utilize the first additive to treat exhaust gases and the first, third, and fourth catalytic devices are configured to utilize the second additive to treat exhaust gases.

19. The apparatus of claim 18, wherein the first and second additive dosers are disposed upstream of the passage.

20. The apparatus of claim 18, wherein the exhaust inlet section comprises a cross-sectional area equal to or greater than a combined cross-sectional area of the elongate exhaust gas passage and second catalytic device inlet.

21. A diesel exhaust gas stream treatment system, the system comprising:
a housing;
first, second, and third elongate exhaust gas channels disposed in parallel arrangement within the housing, each channel comprising an inlet end and an outlet end, the outlet end of the first channel being connected to the inlet end of the second channel and the outlet end of the second channel being connected to the inlet end of the third channel such that the gas stream travels down the first channel in a first direction, down the second channel in a second direction, the second direction being substantially the opposite of the first direction, and down the third channel in the first direction;
a urea doser coupled to the housing and configured to inject urea into the first elongate exhaust gas channel;
a liquid hydrocarbon doser coupled to the housing and configured to inject liquid hydrocarbon into the first elongate exhaust gas channel;
a selective catalytic reduction catalyst disposed in the second channel and through which the exhaust gas stream flows in the second direction, the selective catalytic reduction catalyst configured to utilize urea injected into the exhaust gas stream by the urea doser to treat the exhaust gas stream; and
an oxidation filter disposed within the housing, the oxidation filter configured to utilize liquid hydrocarbon injected into the exhaust gas stream by the liquid hydrocarbon doser to treat the exhaust gas stream;
wherein the second elongate exhaust gas channel has a substantially racetrack-shaped cross-section with two curved ends and two substantially straight sides in cross-section, the first elongate exhaust gas channel being coextensive with a respective one of the two substantially straight sides, and the third elongate exhaust gas channel being coextensive with the other of the two substantially straight sides, and wherein the combined outer perimeters of the first, second, and third elongate exhaust gas channels form a substantially square shape in cross-section.

22. The system of claim 21, wherein the selective catalytic reduction catalyst comprises a doughnut-type flow-through catalytic device, and wherein the first channel is disposed through the hole in the selective catalytic reduction catalyst.

23. The system of claim 21, wherein the housing is substantially square in cross-section and the third channel is disposed in a corner of the square.

24. The system of claim 21, wherein the selective catalytic reduction catalyst comprises a racetrack-type flow-through catalytic device.

25. The system of claim 24, wherein the combination of the selective catalytic reduction catalyst, the first channel and the third channel is substantially square in cross-section.

* * * * *